US011489653B2

United States Patent
Tsai et al.

(10) Patent No.: US 11,489,653 B2
(45) Date of Patent: Nov. 1, 2022

(54) COMMUNICATION METHOD AND USER EQUIPMENT FOR OPERATIONS WITH BANDWIDTH PART SWITCHING

(71) Applicant: FG Innovation Company Limited, Tuen Mun (HK)

(72) Inventors: Hsin-Hsi Tsai, Taipei (TW); Chia-Hung Wei, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 80 days.

(21) Appl. No.: 17/113,076

(22) Filed: Dec. 6, 2020

(65) Prior Publication Data

US 2021/0176029 A1    Jun. 10, 2021

Related U.S. Application Data

(60) Provisional application No. 62/945,011, filed on Dec. 6, 2019.

(51) Int. Cl.
*H04L 5/00* (2006.01)
*H04B 7/06* (2006.01)
(Continued)

(52) U.S. Cl.
CPC ......... *H04L 5/0098* (2013.01); *H04B 7/0626* (2013.01); *H04L 1/1614* (2013.01);
(Continued)

(58) Field of Classification Search
CPC ..... H04L 5/0098; H04L 1/1614; H04L 5/001; H04B 7/0626; H04W 52/365;
(Continued)

(56) References Cited

U.S. PATENT DOCUMENTS

2019/0053170 A1 *  2/2019  Lee .................. H04W 24/10
2019/0103954 A1    4/2019  Lee et al.
(Continued)

FOREIGN PATENT DOCUMENTS

CN        110519853 A     11/2019
WO   WO-2021088878 A1 *  5/2021   ........... H04L 5/0053

OTHER PUBLICATIONS

LG Electronics, Discussion on L1 based Scell dormancy, 3GPP TSG-RAN WG2 Meeting #108, Reno, USA, Nov. 18-22, 2019, R1-1912407 (Year: 2019).*
(Continued)

*Primary Examiner* — Shailendra Kumar
(74) *Attorney, Agent, or Firm* — ScienBiziP, P.C.

(57) ABSTRACT

A communication method and a User Equipment (UE) for operations with Bandwidth Part (BWP) switching are provided. The communication method is performed by a UE configured, by a Base Station (BS), with a serving cell and a dormancy group, the. The serving cell belongs to the dormancy group. The communication method includes activating a dormant BWP as an activated BWP for the serving cell; receiving, from the BS, one of a first indication for BWP switching for the serving cell and a second indication for BWP switching for the dormancy group; switching the activated BWP for the serving cell, based on one of the first indication and the second indication, from the dormant BWP to a non-dormant BWP; and triggering a first Power Headroom Reporting (PHR) upon switching the activated BWP for the serving cell from the dormant BWP to the non-dormant BWP.

20 Claims, 7 Drawing Sheets

(51) Int. Cl.
*H04L 1/16* (2006.01)
*H04W 52/36* (2009.01)
*H04W 72/04* (2009.01)
*H04W 76/11* (2018.01)
*H04W 76/27* (2018.01)

(52) U.S. Cl.
CPC ....... *H04W 52/365* (2013.01); *H04W 72/042* (2013.01); *H04W 72/0453* (2013.01); *H04W 76/11* (2018.02); *H04W 76/27* (2018.02)

(58) Field of Classification Search
CPC ........... H04W 72/042; H04W 72/0453; H04W 76/11; H04W 76/27
See application file for complete search history.

(56) References Cited

U.S. PATENT DOCUMENTS

| | | | |
|---|---|---|---|
| 2019/0289513 A1 | 9/2019 | Jeon et al. | |
| 2020/0314885 A1* | 10/2020 | Cirik | H04W 52/028 |
| 2021/0021397 A1* | 1/2021 | Kim | H04L 1/1685 |
| 2021/0029772 A1* | 1/2021 | Islam | H04W 76/27 |

OTHER PUBLICATIONS

Huawei, HiSilicon, MAC impact to support the efficient and low latency SCell configuration and activation, 3GPP TSG-RAN WG2 Meeting #108, Reno, USA, Nov. 18-22, 2019, R2-1914679 (Year: 2019).*

3GPP TS 38.321 V15.7.0 (Sep. 2019), 3rd Generation Partnership Project; Technical Specification Group Radio Access Network; NR; Medium Access Control (MAC) protocol specification (Release 15) (Year: 2019).*

Vivo, UE behaviour for a suspended SCG, 3GPP TSG-RAN WG2 Meeting #108, Reno, USA, Nov. 18-22, 2019, R2-1914944. (Year: 2019).*

LG Electronics: "Discussion on L1 based Scell dormancy", R1-1912407, 3GPP TSG RAN WG1 Meeting #99, Reno, USA, Nov. 18-22, 2019.

Huawei, HiSilicon: "MAC impact to support the efficient and low latency SCell configuration and activation", R2-1914679, 3GPP TSG-RAN WG2 Meeting #108, Reno, USA, Nov. 18-22, 2019.

Vivo: "UE behaviour for a suspended SCG", R2-1914944, 3GPP TSG-RAN WG2 Meeting #108, Reno, Nevada, USA, Nov. 18-22, 2019.

* cited by examiner

COMMUNICATION METHOD AND USER EQUIPMENT FOR OPERATIONS WITH BANDWIDTH PART SWITCHING

CROSS-REFERENCE TO RELATED APPLICATION(S)

The present disclosure claims the benefit of and priority to provisional U.S. Patent Application Ser. No. 62/945,011 ("the '011 provisional"), filed on Dec. 6, 2019, entitled "Method and Apparatus for Transition Out of Dormant Bandwidth Part." The content(s) of the '005 provisional are fully incorporated herein by reference for all purposes.

FIELD

The present disclosure is generally related to wireless communications, and specifically, to a communication method and a User Equipment (UE) for operations with Bandwidth Part (BWP) switching.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure is directed to a communication method and a UE for operations with BWP switching between a non-dormant BWP and a dormant BWP.

According to an aspect of the present disclosure, a communication method for operations with Bandwidth Part (BWP) switching is provided. The communication method is performed by a UE configured, by a Base Station (BS), with a serving cell and a dormancy group, the. The serving cell belongs to the dormancy group. The communication method includes activating a dormant BWP as an activated BWP for the serving cell; receiving, from the BS, one of a first indication for BWP switching for the serving cell and a second indication for BWP switching for the dormancy group; switching the activated BWP for the serving cell, based on one of the first indication and the second indication, from the dormant BWP to a non-dormant BWP; and triggering a first Power Headroom Reporting (PHR) upon switching the activated BWP for the serving cell from the dormant BWP to the non-dormant BWP.

According to another aspect of the present disclosure, a UE for operations with BWP switching is provided. The UE is configured, by a BS, with a serving cell and a dormancy group, the. The serving cell belongs to the dormancy group. The UE includes a processor and a memory coupled to the processor. The memory stores at least one computer-executable program that, when executed by the processor, causes the processor to activate a dormant BWP as an activated BWP for the serving cell; receive, from the BS, one of a first indication for BWP switching for the serving cell and a second indication for BWP switching for the dormancy group; switch the activated BWP for the serving cell, based on one of the first indication and the second indication, from the dormant BWP to a non-dormant BWP; and trigger a first Power Headroom Reporting (PHR) upon switching the activated BWP for the serving cell from the dormant BWP to the non-dormant BWP.

BRIEF DESCRIPTION OF THE DRAWINGS

Aspects of the present disclosure are best understood from the following detailed disclosure when read with the accompanying figures. Various features are not drawn to scale. Dimensions of various features may be arbitrarily increased or reduced for clarity of discussion.

DESCRIPTION

Figure 1:
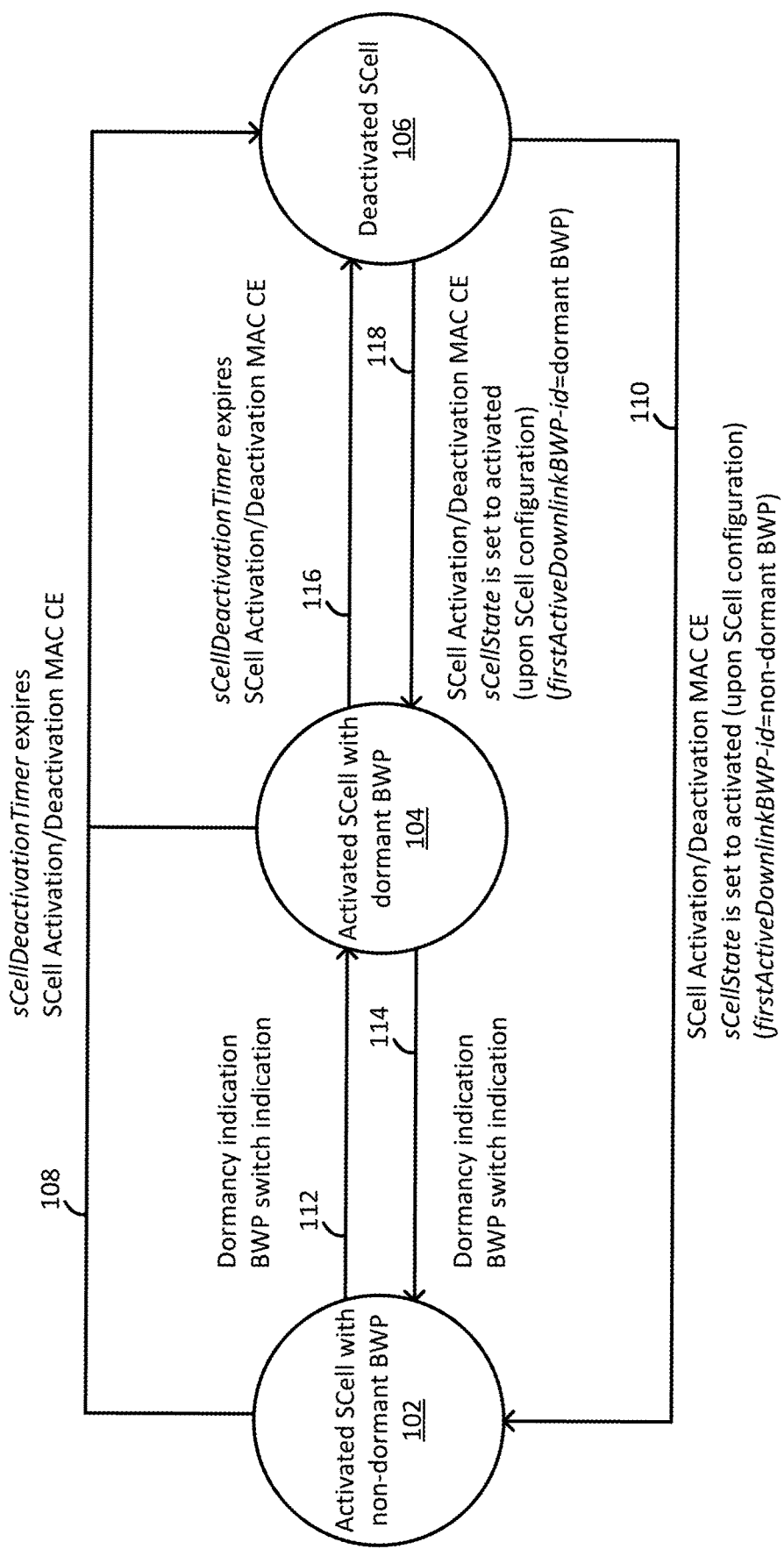
FIG. 1 illustrates state/status transition of a BWP/Secondary Cell (SCell), in accordance with an implementation of the present disclosure.

The terms mentioned in the present disclosure are defined as follows. Unless otherwise specified, the terms in the present disclosure have the following meanings.

| Abbreviation | Full name |
| --- | --- |
| 3GPP | 3rd Generation Partnership Project |
| 5G | 5th Generation |
| 5GC | 5th Generation Core |
| ACK | Acknowledgment |
| BWP | Band Width Part |
| BFI | Beam Failure Indication |
| BFR | Beam Failure Recovery |
| BS | Base Station |
| BSR | Buffer Status Report |
| BWP | Bandwidth Part |
| CA | Carrier Aggregation |
| CC | Component Carrier |
| CE | Control Element |
| CORESET | Control Resource Set |
| CQI | Channel Quality Indication |
| CSI | Channel State Information |
| DCI | Downlink Control Information |

| Abbreviation | Full name |
| --- | --- |
| DL | Downlink |
| DRX | Discontinuous Reception |
| E-UTRAN | Evolved Universal Terrestrial Radio Access Network |
| EPC | Evolved Packet Core |
| HARQ | Hybrid Automatic Repeat Request |
| ID | Identifier |
| IE | Information Element |
| LBT | Listen Before Talk |
| LTE | Long Term Evolution |
| MAC | Medium Access Control |
| MCG | Master Cell Group |
| MIMO | Multi-input Multi-output |
| MN | Master Node |
| NAS | Non-Access Stratum |
| NE-DC | NR-E-UTRA Dual Connectivity |
| NR | New RAT/Radio |
| NR-U | New Radio Unlicensed |
| PCell | Primary Cell |
| PDCCH | Physical Downlink Control Channel |
| PDSCH | Physical Downlink Shared Channel |
| PDU | Protocol Data Unit |
| PHR | Power Headroom Reporting |
| PHY | Physical |
| PSCell | Primary Secondary Cell |
| PDCP | Packet Data Convergence Protocol |
| PS-RNTI | Power Saving Radio Network Temporary Identity |
| PSS | Power Saving Signal |
| PUCCH | Physical Uplink Control Channel |
| PUSCH | Physical Uplink Shared Channel |
| RA | Random Access |
| RACH | Random Access Channel |
| RAN | Radio Access Network |
| RAR | Random Access Response |
| RF | Radio Frequency |
| RLC | Radio Link Control |
| RRC | Radio Resource Control |
| RS | Reference Signal |
| SCell | Secondary Cell |
| SCH | Shared Channel |
| SCG | Secondary Cell Group |
| SDAP | Service Data Adaptation Protocol |
| SpCell | Special Cell |
| SPS | Semi-Persistent Scheduling |
| SR | Scheduling Request |
| SRS | Sounding Reference Signal |
| TA | Timing Alignment |
| TAI | Tracking Area Identifier |
| TB | Transport Block |
| TDD | Time Division Duplex |
| TR | Technical Report |
| TRP | Transmission/Reception Point |
| TS | Technical Specification |
| TX | Transmission |
| UE | User Equipment |
| UL | Uplink |
| WG | Working Group |
| WI | Working Item |
| WUS | Wake Up Signaling |

The following contains specific information pertaining to example implementations in the present disclosure. The drawings and their accompanying detailed disclosure are directed to merely example implementations of the present disclosure. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a specific feature, structure, or characteristic, but not every possible implementation of the present disclosure necessarily includes the specific feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are never meant to characterize that all implementations of the present disclosure must include the specific feature, structure, or characteristic, and should instead be understood to mean "at least some implementations of the present disclosure" includes the stated specific feature, structure, or characteristic. The term "coupled" is defined as connected, whether directly or indirectly through intervening components, and is not necessarily limited to physical connections. The term "comprising," when utilized, means "including but not necessarily limited to"; it specifically indicates open-ended inclusion or membership in the disclosed combination, group, series, and the equivalent. The terms "system" and "network" in the present disclosure may be used interchangeably.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. The character "/" used herein generally represents that the former and latter associated objects are in an "or" relationship.

Additionally, for a non-limiting explanation, specific details, such as functional entities, techniques, protocols, standards, and the like, are set forth for providing an understanding of the disclosed technology. In other examples, detailed disclosure of well-known methods, technologies, systems, architectures, and the like are omitted so as not to obscure the present disclosure with unnecessary details.

Persons skilled in the art will immediately recognize that any network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Applications Specific Integrated Circuitry (ASIC), programmable logic arrays, and/or using one or more Digital Signal Processors (DSPs). Although some of the example implementations disclosed are oriented to software installed and executing on computer hardware, alternative example implementations implemented as firmware or as hardware or combination of hardware and software are well within the scope of the present disclosure.

The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, or an LTE-Advanced Pro system) may typically include at least one Base Station (BS), at least one UE, and one or more optional network elements that provide connection towards a network. The UE may communicate with the network (e.g., a Core Network (CN), an Evolved Packet Core (EPC) network, an Evolved Universal Terrestrial Radio Access Network (E-UTRAN), a Next-Generation Core (NGC), or an Internet), through a Radio Access Network (RAN) established by the BS.

In the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a Node B (NB) as in the Universal Mobile Telecommunication System (UMTS), an evolved Node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols mentioned above.

The BS may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the $3^{rd}$ Generation Partnership Project (3GPP), may serve as a baseline for an NR waveform. The scalable OFDM numerology, such as the adaptive subcarrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the network dynamics of NR. Besides, an SL resource may also be provided in an NR frame to support ProSe services.

In LTE, when CA is configured, the UE may only have one RRC connection with the network. During the RRC connection establishment/re-establishment/handover, a serving cell may provide NAS mobility information (e.g., TAI); during the RRC connection establishment/re-establishment/handover, the serving cell may provide the security input. The serving cell may be a PCell. Depending on UE capabilities, SCells may be configured to form together with the PCell a set of serving cells. Therefore, the configured set of serving cells for a UE may always include one PCell and one or more SCells. An SCell may be configured to start in a deactivated mode, a dormant mode, or an activated mode. Unlike SCells, the PCell cannot be deactivated or cannot operate in the SCell dormant mode.

To enable reasonable UE battery consumption when CA is configured, an activation/deactivation mechanism of SCells may be applied (but the activation/deactivation mechanism may not apply to the PCell). When an SCell is deactivated, the UE does not need to receive the corresponding PDCCH or PDSCH, does not perform transmission in the corresponding UL, and does not need to perform CQI measurements. When an SCell is activated (active), the UE may receive PDSCH and/or PDCCH (e.g., if the UE is configured to monitor PDCCH from this SCell) and is expected to be able to perform CQI measurements.

To enable faster CQI reporting, a temporary CQI reporting period (which may be referred to a short CQI period)

may be used during an SCell activation period. The activation/deactivation mechanism may be achieved based on MAC CE signaling and/or deactivation timer(s). The MAC CE (e.g., an SCell Activation/Deactivation MAC CE) may include a bitmap for the activation and deactivation of SCells. Each bit in the bitmap may correspond to an SCell.

For example, a bit in the bitmap may be set to a first bit value (e.g., "1") to indicate the activation of the corresponding SCell, or set to a second bit value (e.g., "0") to indicate the deactivation of the corresponding SCell. With the bitmap, SCells may be activated and deactivated separately, and thus a subset of the SCells can be activated/deactivated by a single activation/deactivation command (e.g., an SCell Activation/Deactivation MAC CE). The deactivation timer (e.g., sCellDeactivationTimer) may be maintained on a per-SCell basis. A common value for each deactivation timer of each SCell may be configured per-UE basis by RRC.

In NR, a new type of BWP, which may be referred to as a dormant BWP, may be used to reduce the long activation delay of a serving cell. The dormancy mechanism in NR may be modeled by the dormant BWP. In other words, a BWP framework may be reused for transitioning between dormancy and non-dormancy. An SCell dormancy behavior/operation may be implemented at the UE by configuring the UE with a DL BWP with a CSI reporting configuration for the DL BWP but not configuring a PDCCH configuration for the DL BWP. Thus, when the DL BWP is activated, the UE may not monitor PDCCH, but may perform CSI measurements and/or CSI reporting for the DL BWP. The network may configure a dormant BWP ID to the UE via an RRC message. A UE may perform BWP switching to switch the active BWP of an SCell to a dormant BWP, for example, when receiving a BWP switch indication (e.g., via PDCCH or RRC (re-)configuration) or a dormancy indication (e.g., via DCI scrambled by PS-RNTI, via DCI with format 0_1, and/or via DCI with formant 1_1) As disclosed previously, a UE may not perform PDCCH monitoring on a dormant BWP. This behavior may be achieved by, for example, configuring the UE with a BWP configuration without a PDCCH configuration (e.g., pdcch-Config). In one implementation, the dormant BWP may be configured for an SCell only when the SCell is configured with other configured BWP(s) (which may be referred to as a "non-dormant BWP").

There may be only one (configured) dormant BWP for an SCell. A UE may identify the dormant BWP, e.g., based on the IE dormantBWP-Id, from the configured BWPs based on an RRC configuration. A non-dormant BWP may be configured by the network and activated, e.g., when receiving a BWP switch indication (e.g., via PDCCH or RRC (re-)configuration) or a dormancy indication (e.g., via DCI scrambled by PS-RNTI, via DCI with format 0_1, and/or via DCI with formant 1_1).

Specifically, the BWP switch indication may be a specific indication that includes (but not limited to) BWP information (e.g., BWP index) for BWP switching. More specifically, the specific indication may further include other information for other purposes.

Characteristics and features of a dormant BWP and a non-dormant BWP are as follows:

Dormant BWP:

The UE may not monitor PDCCH and may continue to perform CSI measurements and/or CSI reporting for the dormant BWP.

The dormant BWP may not be configured with a configuration of PDCCH monitoring, e.g., the IE pdcch-Config may be absent in the BWP configuration of the dormant BWP.

For example, the BWP ID of the dormant BWP may be indicated by the IE dormantBWP-Id.

Non-Dormant BWP:

A BWP which is not a dormant BWP (or that can be configured with PDCCH monitoring) may be considered as a non-dormant BWP.

For example, the BWP ID of the non-dormant BWP may be different from the BWP ID indicated by the IE dormantBWP-Id.

In one implementation, the transition between a dormant BWP and a non-dormant BWP may rely on an L1-based mechanism, e.g., via L1 signaling (e.g., DCI), which may refer to a dormancy indication. The dormancy indication may be transmitted via different DCI formats depending on whether the UE is in the Active Time of DRX.

When the UE is in the Active Time, the dormancy indication may be sent on a PCell via a PDCCH which may be (or may not be) used for scheduling data.

The explicit information field in DCI may be a bitmap (appended to scheduling DCI) with up to X2 (e.g., 5) bits, and 1 bit per group of configured SCells (e.g., per dormancy group). Each dormancy group may have one or multiple SCells. Specifically, up to X2 SCells may be configured via RRC signaling.

The DCI formats 0-1 and/or 1-1 may be used. The explicit information field in DCI may be a bitmap with 1 bit per configured SCell and/or per dormancy group, When the UE is not in the Active Time, the dormancy indication may be sent on a PCell via a Power Saving Signal (PSS)/Power Saving Channel (e.g., DCI format 2_6). Specifically, the PSS may be scrambled by a specific RNTI (e.g., PS-RNTI).

In one implementation, the PSS may include a wake-up indication and/or a dormancy indication. For example, the dormancy indication may include a bitmap with up to X1 (e.g., 5) bits. Each bit in the bitmap may correspond to a group of configured SCells (e.g., dormancy group). Each dormancy group may have one or multiple SCells, where up to X1 SCell groups may be configured via RRC signaling.

For the dormancy indication represented by a DCI field, a bitmap may be included. The bitmap may be set to a first bit value (e.g., "0") or a second bit value (e.g., "1").

If the bitmap is set to the first bit value (e.g., "0"), and if the UE is operating in a non-dormant BWP, the UE may switch to a dormant BWP (e.g., indicated by dormantBWP-Id). If the bitmap is set to the first bit value (e.g., "0"), and if the UE is operating in a dormant BWP, the UE may stay in the dormant BWP. If the bitmap is set to the second bit value (e.g., "1"), and if the UE is operating in a non-dormant BWP, the UE may stay in the non-dormant BWP. If the bitmap is set to the second bit value (e.g., "1"), and if the UE is operating in a dormant BWP, the UE may switch to a specific non-dormant BWP explicitly configured by RRC (e.g., indicated by firstOutsideActiveTimeBWP-Id).

In NR, an SCell may operate in one of the following states/statuses:

1. The SCell is an activated SCell with an activated non-dormant BWP;

2. The SCell is an activated SCell with an activated dormant BWP; and

3. The SCell is a deactivated SCell.

sCellDeactivationTimer (e.g., as specified in 3GPP TS 38.321 V15.7.0 and 3GPP TS 38.331 V15.7.0): the associated (activated) SCell (with activated non-dormant/dormant BWP) may be deactivated upon the expiry of the sCellDeactivationTimer. The sCellDeactivationTimer may be (re-)started if the associated SCell is activated. The sCellDeactivationTimer may be (re-)started if a PDCCH on the associated SCell indicates an UL grant or DL assignment, or if a PDCCH on the serving cell scheduling the associated SCell indicates an UL grant or a DL assignment for the associated SCell SCell, or if a MAC PDU is transmitted in a configured UL grant or received in a configured DL assignment. If the field of the sCellDeactivationTimer is absent, the UE may consider the value of the sCellDeactivationTimer as "infinity." The time unit of the sCellDeactivationTimer may be configured as mini-slot, sub-slot, slot, symbol, frame, system frame, sub-millisecond, millisecond, or second.

In one implementation, the sCellDeactivationTimer may be used to transition the state/status of an SCell.

FIG. 1 illustrates state/status transition of a BWP/Secondary Cell (SCell), in accordance with an implementation of the present disclosure. In state 102, the SCell is in the activated state, and the active BWP of the SCell is a non-dormant BWP. In state 104, the SCell is in the activated state (hereinafter "activated SCell"), and the active BWP of the SCell is a dormant BWP. In state 106, the SCell is in the deactivated state (hereinafter "deactivated SCell").

In action 108, the activated SCell with the activated non-dormant BWP may be transitioned to the deactivated state as the UE receives an SCell Activation/Deactivation MAC CE and/or the sCellDeactivationTimer expires. For example, when the UE receives the SCell Activation/Deactivation MAC CE which indicates that the SCell is to be deactivated, the UE may deactivate the SCell. For example, when an sCellDeactivationTimer associated with an SCell expires, the UE may deactivate the SCell.

In action 110, the deactivated SCell may be transitioned to the activated SCell with the activated non-dormant BWP by an SCell Activation/Deactivation MAC CE or an RRC (re-)configuration. For example, when the UE receives the SCell Activation/Deactivation MAC CE which indicates that the SCell is to be activated, the UE may activate the SCell.

Specifically, the IE firstActiveDownlinkBWP-Id may be set to a non-dormant BWP. For example, which BWP should be activated when the SCell is activated may be configured in an IE denoted as firstActiveDownlinkBWP-Id (e.g., as specified in 3GPP TS 38.331 V15.7.0) and/or an IE denoted as firstActiveUplinkBWP (e.g., as specified in 3GPP TS 38.331 V15.7.0). For example, when an SCell is configured, by the RRC (re-)configuration, with sCellState set to activated upon SCell configuration, and firstActiveDownlinkBWP-Id is set to a non-dormant BWP, the UE may activate the SCell and activated the non-dormant BWP.

In action 112, the activated SCell with the activated non-dormant BWP may be transitioned to the activated SCell with the activated dormant BWP by at least one of a BWP switch indication and a dormancy indication.

For example, the UE may receive a BWP switch indication which indicates to the UE to switch a non-dormant BWP of an activated SCell to a dormant BWP.

For example, the UE may receive a dormancy indication which indicates to the UE to switch a non-dormant BWP of an activated SCell (or a group of SCells, e.g., the group may be a dormancy group, and activated SCell belongs to the dormancy group) to a dormant BWP.

In action 114, the activated SCell with activated dormant BWP may be transitioned to the activated SCell with the activated non-dormant BWP by at least one of a BWP switch indication, and a dormancy indication.

For example, the UE may receive a BWP switch indication which indicates to the UE to switch a dormant BWP of an activated SCell to a non-dormant BWP.

For example, the UE may receive a dormancy indication which indicates to the UE to switch a dormant BWP of an activated SCell (or a group of SCells, e.g., the group may be a dormancy group, and activated SCell belongs to the dormancy group) to a non-dormant BWP.

In action 116, the activated SCell with activated dormant BWP may be transitioned to the deactivated state by an SCell Activation/Deactivation MAC CE and/or an sCellDeactivationTimer.

For example, when the UE receives the SCell Activation/Deactivation MAC CE which indicates to the UE that the SCell is to be deactivated, the UE may deactivate the SCell. For example, when an sCellDeactivationTimer associated with an SCell expires, the UE may deactivate the SCell.

In action 118, the deactivated SCell may be transitioned to the activated SCell with the activated dormant BWP by an SCell Activation/Deactivation MAC CE or an RRC (re-)configuration.

For example, when the UE receives the SCell Activation/Deactivation MAC CE which indicates to the UE that the SCell to be activated, the UE may activate the SCell. Specifically, the IE firstActiveDownlinkBWP-Id may be set to a dormant BWP. Which BWP should be activated when the SCell is activated may be configured in the firstActiveDownlinkBWP-Id (e.g., as specified in 3GPP TS 38.331 V15.7.0) and/or the firstActiveUplinkBWP (e.g., as specified in 3GPP TS 38.331 V15.7.0).

When an SCell is configured, by the RRC (re-)configuration, with sCellState set to activated upon SCell configuration, and firstActiveDownlinkBWP-Id is set to a dormant BWP, the UE may activate the SCell and activated the dormant BWP.

In one implementation, for each activated serving cell configured with a BWP(s), the UE may perform DL reception (e.g., monitoring a PDCCH, reception on a DL-SCH, etc.) and/or perform UL transmission (e.g., transmission on an UL-SCH, transmission on a RACH, transmission on a PUCCH, reporting CSI, transmitting an SRS, etc.) on a BWP which is activated for the activated serving cell. If cross-carrier scheduling is applied, the UE may perform the DL reception and/or UL transmission, scheduled by a first serving cell, for a BWP which is activated for a second serving cell.

In one implementation, if the activated BWP for the activated SCell is a dormant BWP, the UE may not perform some DL reception (e.g., monitoring a PDCCH, reception on a DL-SCH, etc.) and may not perform some UL transmission (e.g., transmission on an UL-SCH, transmission on a RACH, transmission on a PUCCH, etc.) on (or for) the dormant BWP. Since the UE may have different DL reception and/or UL transmission behaviors on a dormant BWP than on a non- dormant BWP, some UE behaviors may need to be performed when the activated BWP of the UE is switched from the dormant BWP to the non-dormant BWP.

In the present disclosure, an activated BWP may be referred to as an active BWP. The activated BWP and the active BWP are not uniformly named in the industry currently and are collectively referred to as the "activated BWP" subsequently for ease of description of the present disclosure.

In one implementation, if the activated BWP of the activated SCell is a dormant BWP, the UE may:
  not monitor the PDCCH on the dormant BWP;
  not monitor the PDCCH for the dormant BWP;
  not receive DL-SCH on the dormant BWP;
  not transmit on UL-SCH on the dormant BWP;
  not transmit on RACH on the dormant BWP;
  not transmit SRS on the dormant BWP;
  not transmit PUCCH on the dormant BWP;
  perform periodic or semi-persistent CSI measurement for the dormant BWP, if configured;
  clear any configured downlink assignment and any configured uplink grant Type 2 associated with the activated SCell;
  suspend any configured uplink grant (e.g., configured grant type 1) associated with the activated SCell; or
  perform beam failure detection and beam failure recovery for the activated SCell if beam failure is detected.

In one implementation, if the activated BWP of the activated SCell is a non-dormant BWP, the UE may:
  transmit on a UL-SCH on the non-dormant BWP;
  transmit on an RACH on the non-dormant BWP, if PRACH occasions are configured;
  monitor the PDCCH on the non-dormant BWP;
  transmit the PUCCH on the non-dormant BWP, if configured;
  report CSI for the non-dormant BWP;
  transmit an SRS on the non-dormant BWP, if configured; or
  receive a DL-SCH on the non-dormant BWP.

BWP Switching from Dormant BWP to Non-Dormant BWP

In one implementation, a UE may perform one or more of the following operations(s) (e.g., Operation (1) to Operation (5)) if the activated BWP of a serving cell is switched from a dormant BWP to a non-dormant BWP.

In one implementation, a UE may perform one or more of the following operations(s) (e.g., Operation (1) to Operation (5)) when a UE receives a dormancy indication (in the (DRX) Active Time and/or outside the (DRX) Active Time) for a serving cell (and/or for a dormancy group of the serving cell), where the dormancy indication includes the information that indicates to the UE to switch the activated BWP of a serving cell from a dormant BWP to a non-dormant BWP. For example, the UE may deactivate the dormant BWP of the serving cell and activate the non-dormant BWP for the serving cell.

In one implementation, a UE may perform one or more of the following operations(s) (e.g., Operation (1) to Operation (5)) when a UE receives a PDCCH and/or DCI for BWP switching for a serving cell, where the PDCCH and/or the DCI for BWP switching may include first information of a serving cell (e.g., a cell index) and/or second information of a non-dormant BWP (e.g., a BWP index which is different from the dormant BWP ID), the UE may deactivate the dormant BWP of the serving cell and activate the non-dormant BWP for the serving cell.

In one implementation, a UE may perform one or more of the following operations(s) (e.g., Operation (1) to Operation (5)) when a UE receives an RRC (re-)configuration message for BWP switching for a serving cell, and the RRC (re-)configuration message indicates to the UE to switch the activated BWP of the serving cell from a dormant BWP to a non-dormant BWP, the UE may deactivate the dormant BWP of the serving cell and activate the non-dormant BWP for the serving cell.

Operation (1): Trigger PHR

In one implementation, when the activated BWP of a serving cell is switched from a dormant BWP to a non-dormant BWP, the UE may trigger a PHR. The PHR may be considered as a procedure, and once the PHR is triggered, the UE may generate and transmit a PHR MAC CE to the network.

In one implementation, the UE behavior for the triggered PHR may be provided in 3GPP TS 38.321 V15.7.0 section 5.4.6.

In one implementation, once a BWP of a serving cell is activated, and the BWP is a non-dormant BWP, the UE may trigger PHR.

In one implementation, once a serving cell is activated and a non-dormant BWP for the serving cell is activated upon activating the serving cell, the UE may trigger a PHR.

In one implementation, the UE may trigger PHR when the UE receives a dormancy indication (in the (DRX) Active Time and/or outside the (DRX) Active Time) for the serving cell, where the dormancy indication may include information that indicates to the UE to switch the activated BWP of a serving cell from a dormant BWP to a non-dormant BWP. In one implementation, the UE may trigger PHR when the UE receives a dormancy indication for a dormancy group of serving cells, where the dormancy indication may include information that indicates to the UE to switch the activated BWP of the serving cells in the dormancy group from a dormant BWP to a non-dormant BWP.

In one implementation, when a UE receives a PDCCH and/or DCI for BWP switching for a serving cell, where the PDCCH and/or the DCI for BWP switching indicates to the UE to switch the activated BWP of the serving cell to a non-dormant BWP, the UE may trigger PHR. In one implementation, when a UE receives an RRC (re-)configuration message for BWP switching for a serving cell and the RRC (re-)configuration message indicates to the UE to switch the activated BWP of the serving cell to a non-dormant BWP, the UE may trigger PHR.

In one implementation, PHR may be triggered by the UE only when the serving cell is configured with (type 1 and/or type 2) configured grant.

In one implementation, PHR may be triggered by the UE only when the UE (and/or a MAC entity) is configured with UL.

Operation (2): (Re-)start or stop an SCell Deactivation Timer (e.g., sCellDeactivationTimer) associated with the Serving Cell In one implementation, when the activated BWP of a serving cell is switched from a dormant BWP to a non-dormant BWP, the UE may (re-)start or stop the sCellDeactivationTimer associated with the serving cell.

In one implementation, when a BWP of a serving cell is activated, and the BWP is a non-dormant BWP, the UE may (re-)start or stop the sCellDeactivationTimer associated with the serving cell.

In one implementation, once a serving cell is activated, and a non-dormant BWP for the serving cell is activated upon activating the serving cell, the UE may (re-)start or stop the sCellDeactivationTimer associated with the serving cell. In one implementation, the UE may (re-)start or stop the sCellDeactivationTimer associated with a serving cell when the UE receives a dormancy indication (in the (DRX) Active Time and/or outside the (DRX) Active Time) for the serving cell, where the dormancy indication may include information that indicates to the UE to switch the activated BWP from a dormant BWP to a non-dormant BWP. In one implementation, the UE may (re-)start or stop the sCellDeactivationTimer associated with the serving cell when the UE receives a dormancy indication for a dormancy group of serving cells, where the dormancy indication may include information that indicates to the UE to switch the activated BWP of the serving cells in the dormancy group from a dormant BWP to a non-dormant BWP.

In one implementation, when a UE receives a PDCCH and/or DCI for BWP switching for a serving cell, where the PDCCH and/or the DCI indicates to the UE to switch the activated BWP of the serving cell to a non-dormant BWP, the UE may (re-)start or stop the sCellDeactivationTimer associated with the serving cell.

In one implementation, when a UE receives an RRC (re-)configuration message for BWP switching for a serving cell and the RRC (re-)configuration message indicates to the UE to switch the activated BWP of the serving cell to a non-dormant BWP, the UE may (re-)start or stop the sCell-DeactivationTimer associated with the serving cell.

Operation (3): (Re-)start or Stop a BWP Inactivity Timer (e.g., bwp-InactiviTimer) Associated with the Serving Cell In one implementation, when the activated BWP of a serving cell is switched from a dormant BWP to a non-dormant BWP, the UE may (re-)start or stop the bwp-InactiviTimer associated with the serving cell.

In one implementation, when the activated BWP of a serving cell is switched from a dormant BWP to a non-dormant BWP and the non-dormant BWP is not a default BWP/initial BWP, the UE may (re-)start the bwp-Inactivi-Timer associated with the serving cell.

In one implementation, when the activated BWP of a serving cell is switched from a dormant BWP to a non-dormant BWP and the non-dormant BWP is a default BWP/initial BWP, the UE may stop the bwp-InactiviTimer associated with the serving cell.

In one implementation, when a BWP of a serving cell is activated, and the BWP is a non-dormant BWP, the UE may (re-)start or stop the bwp-InactiviTimer associated with the serving cell.

In one implementation, once a serving cell is activated, and a non-dormant BWP for the serving cell is activated upon activating the serving cell, the UE may (re-)start or stop the bwp-InactiviTimer associated with the serving cell.

In one implementation, the UE may (re-)start or stop the bwp-InactiviTimer associated with the serving cell when the UE receives a dormancy indication (in the (DRX) Active Time and/or outside the (DRX) Active Time) for the serving cell, where the dormancy indication may include information that indicates to the UE to switch the activated BWP of a serving cell from a dormant BWP to a non-dormant BWP. In one implementation, the UE may (re-)start or stop the bwp-InactiviTimer associated with the serving cell when the UE receives a dormancy indication for a dormancy group of serving cells, where the dormancy indication may include information that indicates to the UE to switch the activated BWP of the serving cells in the dormancy group from a dormant BWP to a non-dormant BWP.

In one implementation, when a UE receives a PDCCH and/or DCI for BWP switching for a serving cell, where the PDCCH and/or the DCI indicates to the UE to switch the activated BWP of the serving cell to a non-dormant BWP, the UE may (re-)start or stop the bwp-InactiviTimer associated with the serving cell.

In one implementation, when a UE receives an RRC (re-)configuration message for BWP switching for a serving cell and the RRC (re-)configuration message indicates to the UE to switch the activated BWP of the serving cell to a non-dormant BWP, the UE may (re-)start or stop the bwp-InactiviTimer associated with the serving cell.

Operation (4): (Re-)initialize any suspended configured (UL) grants of a specific configured grant (e.g., configured grant type 1) associated with the Serving Cell according to the stored configuration In one implementation, when the activated BWP of a serving cell is switched from a dormant BWP to a non-dormant BWP, the UE may (re-)initialize any suspended configured (UL) grants of a specific configured grant (e.g., configured grant Type 1) associated with the serving cell (on the activated BWP) according to the stored configuration. Specifically, when a UE is configured with a configured grant (e.g., based on ConfiguredGrantConfig), the UE may store the configured grant configuration (and/or the parameters indicated in the configured grant configuration) until the configured grant configuration is released/discard.

In one implementation, when a BWP of a serving cell is activated, and the BWP is a non-dormant BWP, the UE may (re-)initialize any suspended configured (UL) grants of a specific configured grant (e.g., configured grant type 1) associated with the serving cell (on the activated BWP) according to the stored configuration.

In one implementation, once a serving cell is activated, and a non-dormant BWP for the serving cell is activated upon activating the serving cell, the UE may (re-)initialize any suspended configured (UL) grants of a specific configured grant (e.g., configured grant type 1) associated with the serving cell (on the activated BWP) according to the stored configuration.

In one implementation, the UE may (re-)initialize any suspended configured (UL) grants of a specific configured grant (e.g., configured grant type 1) associated with the serving cell (on the activated BWP) according to the stored configuration when the UE receives a dormancy indication (in the (DRX) Active Time and/or outside the (DRX) Active Time) for the serving cell, where the dormancy indication may include information that indicates to the UE to switch the activated BWP of the serving cell from a dormant BWP to a non-dormant BWP. In one implementation, the UE may (re-)initialize any suspended configured (UL) grants of a specific configured grant (e.g., configured grant type 1) associated with the serving cell (on the activated BWP) according to the stored configuration when the UE receives the dormancy indication for the dormancy group of serving cells, where the dormancy indication may include information that indicates to the UE to switch the activated BWP of the serving cells in the dormancy group from a dormant BWP to a non-dormant BWP.

In one implementation, when a UE receives a PDCCH and/or DCI for BWP switching for a serving cell, where the PDCCH and/or the DCI for BWP switching indicates to the UE to switch the activated BWP of the serving cell to a non-dormant BWP, the UE may (re-)initialize any suspended configured (UL) grants of a specific configured grant (e.g., configured grant type 1) associated with the serving cell (on the activated BWP) according to the stored configuration.

In one implementation, when a UE receives an RRC (re-)configuration message for BWP switching for a serving cell and the RRC (re-)configuration message indicates to the UE to switch the activated BWP of the serving cell to a non-dormant BWP, the UE may (re-)initialize any suspended configured (UL) grants of a specific configured grant (e.g., configured grant type 1) associated with the serving cell (on the activated BWP) according to the stored configuration.

Operation (5): Initiate an RA Procedure on the Serving Cell

In one implementation, when the activated BWP of a serving cell is switched from a dormant BWP to a non-dormant BWP, the UE may initiate an RA procedure on the serving cell. The RA procedure may be a 4-step RA procedure or a 2-step RA procedure. In a 4-step RA procedure, the messages may be identified as msg1 (e.g., an RA preamble), msg2 (e.g., an RAR), msg3 (e.g., an RRC connection request) and msg4 (e.g., an RRC contention setup/resolution message). In a 2-step RA procedure, the messages may be identified as msgA (e.g., an RA preamble and/or a payload) and msgB (e.g., an RAR).

In one implementation, when a BWP of a serving cell is activated, and the BWP is a non-dormant BWP, the UE may initiate an RA procedure on the serving cell. In one implementation, once a serving cell is activated and a non-dormant BWP for the serving cell is activated upon activating the serving cell, the UE may initiate an RA procedure on the serving cell.

In one implementation, the UE may initiate an RA procedure on the serving cell when the UE receives a dormancy indication (in the (DRX) Active Time and/or outside the (DRX) Active Time) for the serving cell, where the dormancy indication may include information that indicates to the UE to switch the activated BWP of the serving cell from a dormant BWP to a non-dormant BWP. In one implementation, the UE may initiate an RA procedure on the serving cell when the UE receives a dormancy indication for a dormancy group of serving cells, where the dormancy indication may include information that indicates to the UE to switch the activated BWP of the serving cells in the dormancy group from a dormant BWP to a non-dormant BWP. In one implementation, the UE may initiate an RA procedure on the serving cell when the UE receives the dormancy indication for the serving cell and/or for a dormancy group of the serving cell, and/or when a TA timer (e.g., timeAlignmentTimer) corresponding to the serving cell is not running, where the dormancy indication may include information that indicates to the UE to switch the activated BWP of the serving cells in the dormancy group from a dormant BWP to a non-dormant BWP.

In one implementation, when a UE receives a PDCCH and/or DCI for BWP switching for a serving cell, where the PDCCH and/or the DCI for BWP switching indicates to the UE to switch the activated BWP of the serving cell to a non-dormant BWP, the UE may initiate an RA procedure on the serving cell.

In one implementation, when a UE receives an RRC (re-)configuration message for BWP switching for a serving cell and the RRC (re-)configuration message indicates to the UE to switch the activated BWP of the serving cell to a non-dormant BWP, the UE may initiate an RA procedure on the serving cell.

The present disclosure provides communication method(s) for BWP switching between a dormant BWP and a non-dormant BWP. The communication method(s) is more flexible and better fits the requirements of different 5G scenarios (e.g., BWP switching/transition between a dormant BWP and a non-dormant BWP) than LTE.

Figure 2:
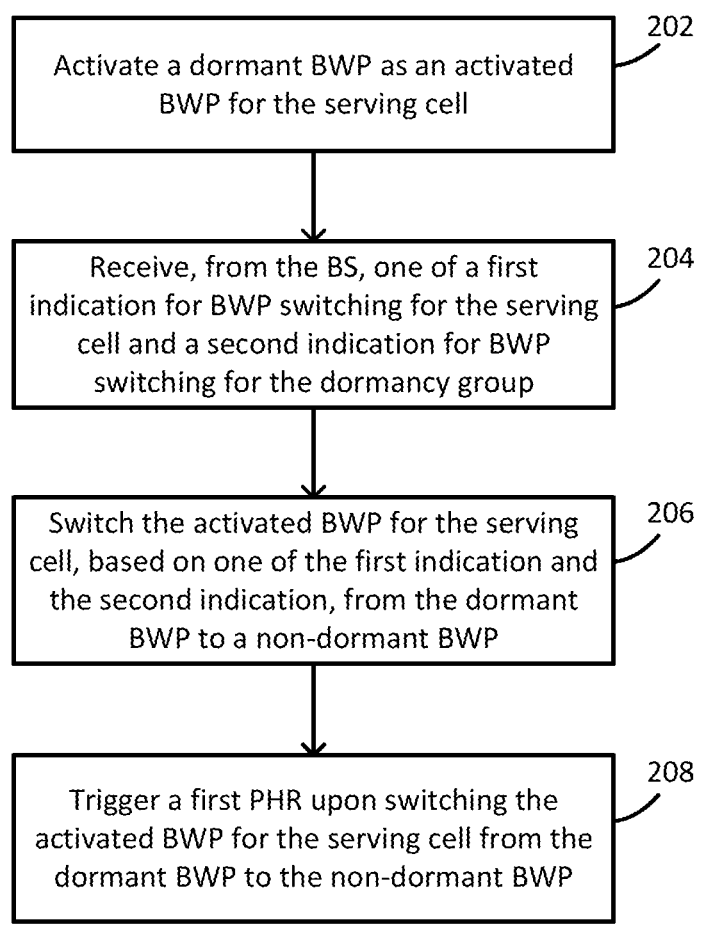
FIG. 2 illustrates a flowchart for a communication method for operations with BWP switching, in accordance with an implementation of the present disclosure.

FIG. 2 illustrates a flowchart for a communication method 200 for BWP switching, in accordance with an implementation of the present disclosure. The communication method 200 may be performed by a UE configured (e.g., configured by a BS) with a serving cell and a dormancy group, wherein the serving cell belongs to the dormancy group.

Although actions 202, 204, 206 and 208 are delineated as separate actions represented as independent blocks in FIG. 2, these separately delineated actions should not be construed as necessarily order dependent. The order in which the actions are performed in FIG. 2 is not intended to be construed as a limitation, and any number of the disclosed blocks may be combined in any order to implement the method, or an alternate method. Moreover, one or more of the actions 202, 204, 206, and 208 may be omitted in some of the present disclosure.

In action 202, the UE may activate a dormant BWP as an activated BWP for the serving cell.

In action 204, the UE may receive, from the BS, one of a first indication for BWP switching for the serving cell and a second indication for BWP switching for the dormancy group.

In action 206, the UE may switch the activated BWP for the serving cell, based on one of the first indication and the second indication, from the dormant BWP to a non-dormant BWP.

In action 208, the UE may trigger a first PHR upon switching the activated BWP for the serving cell from the dormant BWP to the non-dormant BWP.

The first/second indication for BWP switching may be transmitted via L1 signaling (e.g., a BWP switch indication included in DCI) or other higher layer signaling such as MAC CE signaling and/or RRC signaling.

In one implementation, the first indication for BWP switching may include a BWP ID that indicates to the UE to switch the current activated BWP to a BWP indicated by the BWP ID of the serving cell. The first indication may be received, via a Physical Downlink Control Channel (PDCCH) or via a Radio Resource Control (RRC) reconfiguration message, for BWP switching for the serving cell.

In one implementation, the second indication for BWP switching may include a bit that, when set to a first binary value (e.g., "0"), indicates to the UE to switch the activated BWP for the serving cell from the non-dormant BWP to the dormant BWP, and, when set to a second binary value (e.g., "1"), indicates to the UE to switch the activated BWP for the serving cell from the dormant BWP to the non-dormant BWP.

In one implementation, the second indication (for BWP switching) may be received via a PDCCH, and the indication may be included in DCI scrambled by a PS-RNTI, DCI with format 0_1, or DCI with format 1_1.

In one implementation, the second indication (for BWP switching) may include a bitmap associated with at least one dormancy group with each bit of the bitmap corresponding to one of the at least one dormancy group. An example of the second indication for BWP switching is provided in FIG. 6 (e.g., the indication 620).

In one implementation, the serving cell may be an SCell.

In one implementation, the dormant BWP and the non-dormant BWP may be DL BWPs.

Figure 3:
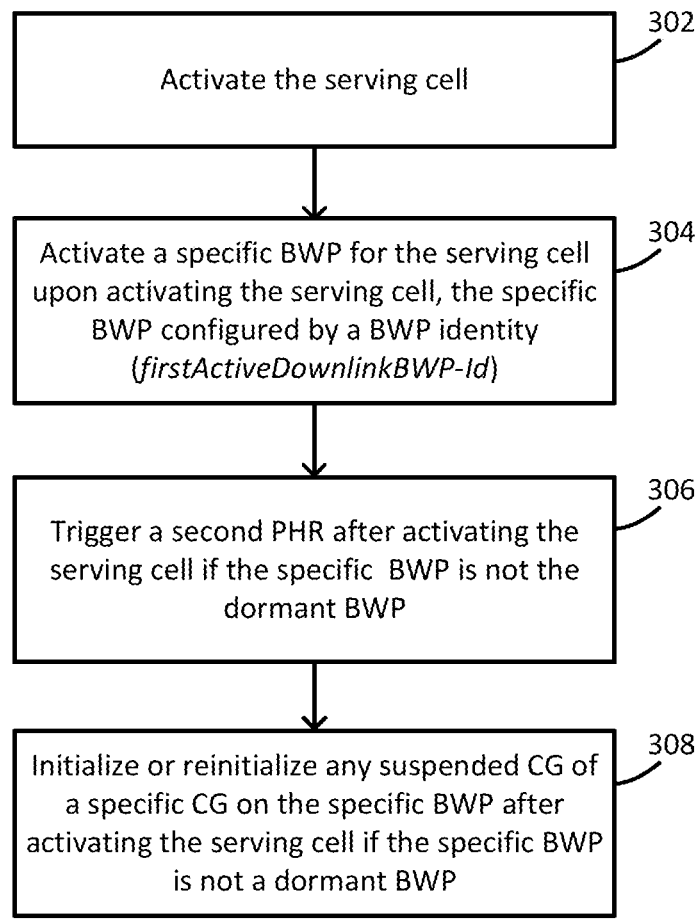
FIG. 3 illustrates a flowchart for a communication method for operations with BWP switching, in accordance with an implementation of the present disclosure.

FIG. 3 illustrates a flowchart for a communication method 300 for BWP switching, in accordance with an implementation of the present disclosure. As illustrated in FIG. 3, the communication method 300 includes actions 302, 304, and 306, and optionally action 308. The communication method 300 may be performed in combination with the communication method 200 in FIG. 2.

In action 302, the UE may activate the serving cell.

In action 304, the UE may activate a specific BWP for the serving cell upon activating the serving cell, where the specific BWP may be configured by a BWP identity (e.g., firstActiveDownlinkBWP-Id).

In action 306, the UE may trigger a second PHR after activating the serving cell if the specific BWP is not the dormant BWP.

In action 308, the UE may initialize or reinitialize any suspended configured grant of a specific configured grant (e.g., configured grant type 1) on the specific BWP after activating the serving cell if the specific BWP is not the dormant BWP.

Figure 4:
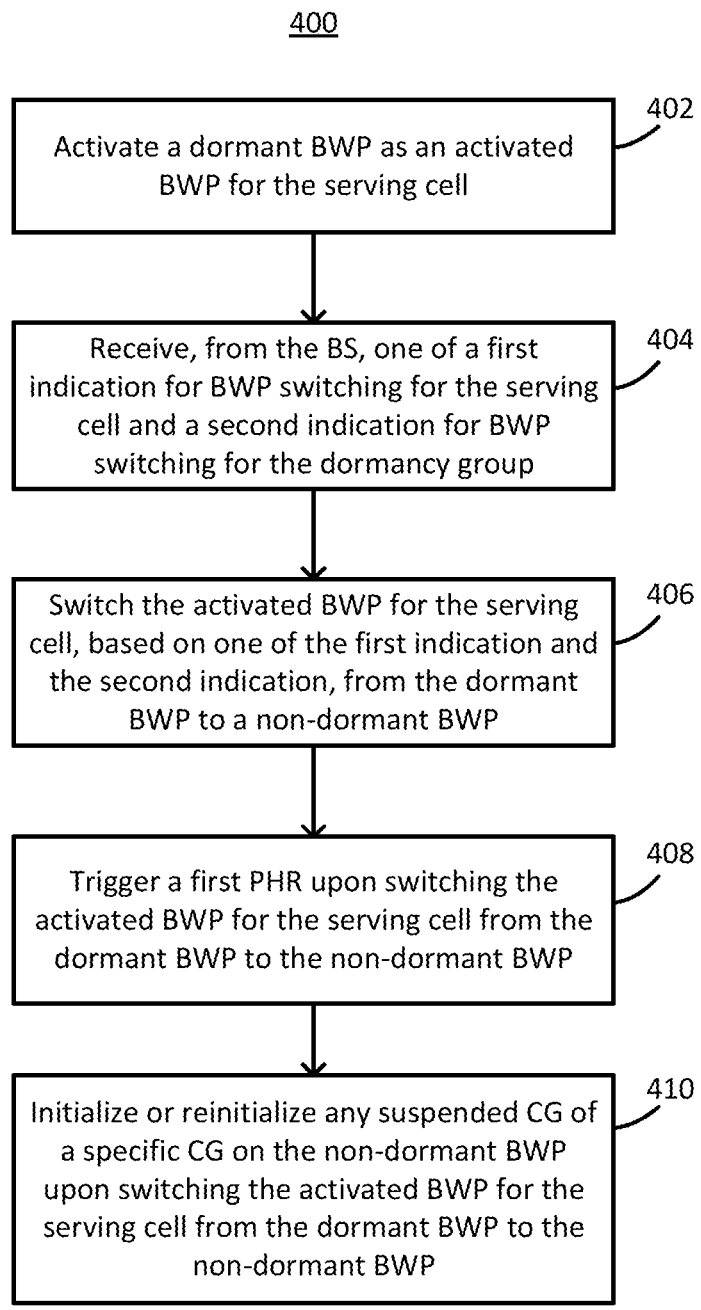
FIG. 4 illustrates a flowchart for a communication method for operations with BWP switching, in accordance with an implementation of the present disclosure.

FIG. 4 illustrates a flowchart for a communication method 400 for BWP switching, in accordance with an implementation of the present disclosure. The communication method 400 may be performed by a UE configured (e.g., configured by a BS) with a serving cell belonging to a dormancy group. The communication method 400 includes actions 402, 404, 406, 408, and 410, where actions 402, 404, 406, and 408 correspond to actions 202, 204, 206, and 208 illustrated in FIG. 2, respectively.

As illustrated in FIG. 4, in action 402, the UE may activate a dormant BWP as an activated BWP for the serving cell.

In action 404, the UE may receive, from the BS, one of a first indication for BWP switching for the serving cell and a second indication for BWP switching for the dormancy group.

In action 406, the UE may switch the activated BWP for the serving cell, based on one of the first indication and the second indication, from the dormant BWP to a non-dormant BWP.

In action 408, the UE may trigger a first PHR upon switching the activated BWP for the serving cell from the dormant BWP to the non-dormant BWP.

In action 410, the UE may initialize or reinitialize any suspended configured grant of a specific configured grant (e.g., configured grant type 1) on the non-dormant BWP upon switching the activated BWP for the serving cell from the dormant BWP to the non-dormant BWP.

As disclosed above, when operating on a dormant BWP, the UE may disable/deactivate/stop PDCCH monitoring operations on (or for) a serving cell but keep performing CSI measurements for the serving cell.

Figure 5:
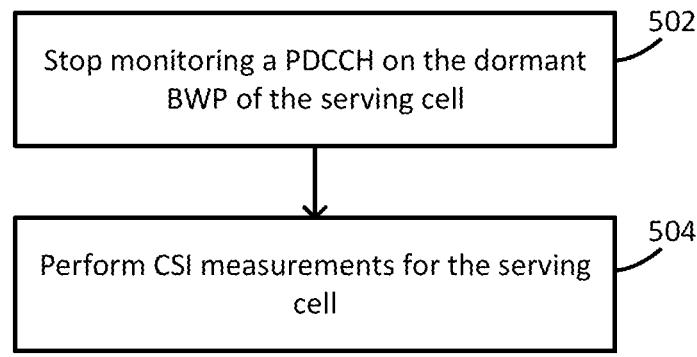
FIG. 5 illustrates a flowchart for (dormancy) operations that a UE may perform on a dormant BWP of a serving cell, in accordance with an implementation of the present disclosure.

FIG. 5 illustrates a flowchart for (dormancy) operations that a UE may perform on a dormant BWP of a serving cell, in accordance with an implementation of the present disclosure. As illustrated in FIG. 5, the (dormancy) operations may include actions 502 and 504.

In action 502, the UE may stop monitoring a PDCCH on the dormant BWP of the serving cell.

In action 504, the UE may perform CSI measurements for the serving cell. For example, the UE may perform periodic or semi-persistent CSI measurement for the dormant BWP of the serving cell., if configured.

It should be understood that actions 502 and 504, illustrated in FIG. 5, are merely an example. Additionally, or alternatively, the UE may have at least one of the following behaviors when operating on a dormant BWP of a serving cell:

The UE may stop monitoring a PDCCH for the dormant BWP of the serving cell.

The UE may not receive DL-SCH on the dormant BWP of the serving cell.

The UE may not transmit on UL-SCH on the dormant BWP of the serving cell.

The UE may not transmit on RACH on the dormant BWP of the serving cell.

The UE may not transmit SRS on the dormant BWP of the serving cell.

The UE may not transmit PUCCH on the dormant BWP of the serving cell.

The UE may clear any configured downlink assignment and any configured uplink grant Type 2 associated with the serving cell.

The UE may suspend any configured uplink grant (e.g., configured grant type 1) associated with the serving cell.

The UE may perform beam failure detection and beam failure recovery for the serving cell if beam failure is detected.

Figure 6:
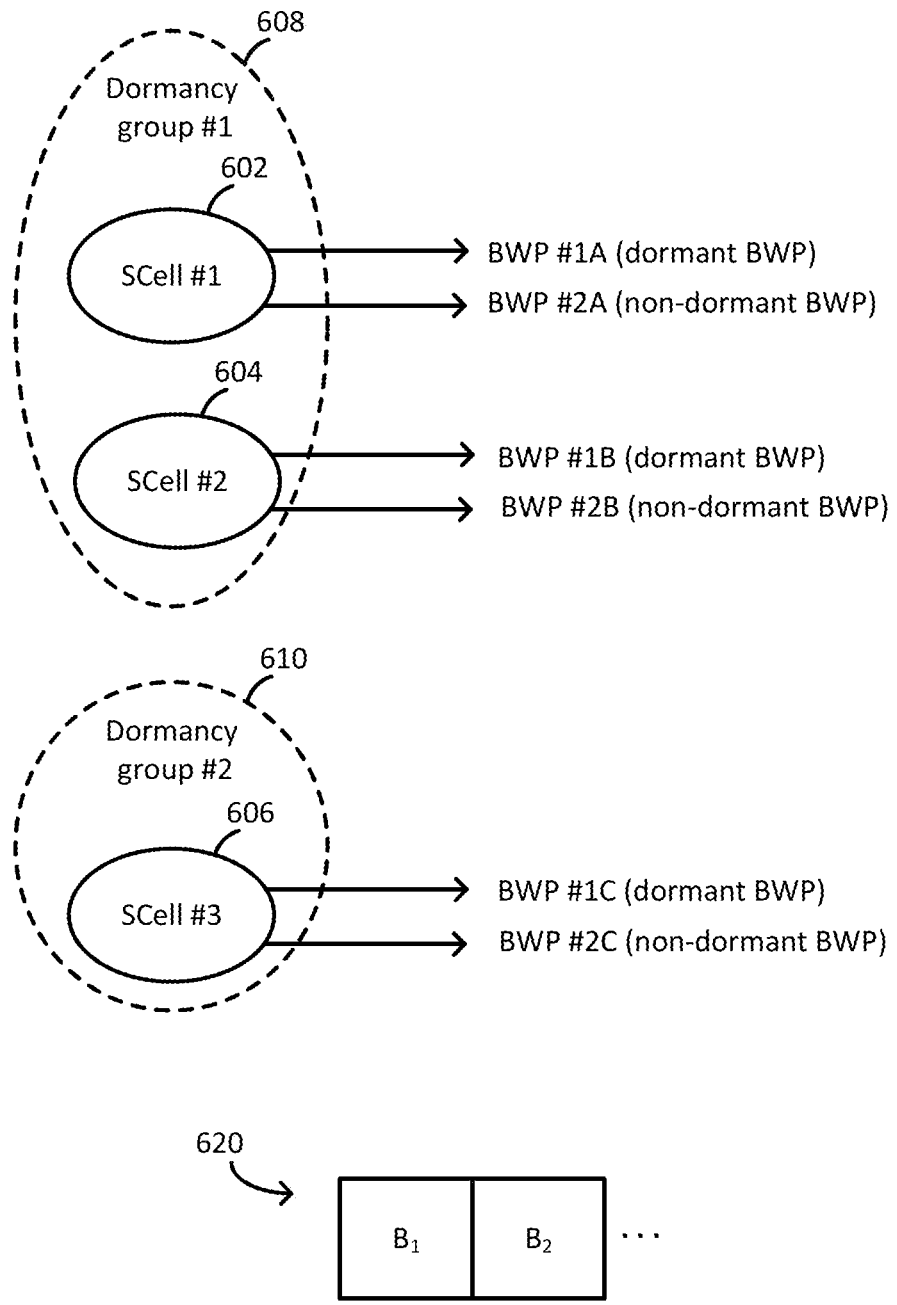
FIG. 6 is a schematic diagram illustrating the correspondence between the SCell(s) in the dormancy groups and the dormant/non-dormant BWPs, in accordance with an implementation of the present disclosure.

FIG. 6 is a schematic diagram illustrating the correspondence between the SCell(s) in the dormancy groups and the dormant/non-dormant BWPs, in accordance with an implementation of the present disclosure.

As illustrated in FIG. 6, the UE may be configured with multiple SCells (e.g., SCell #1 602, SCell #2 604, and SCell #3 606). The UE may receive a first RRC configuration indicating that SCell #1 602 and SCell #2 604 belong to the dormancy group #1 608, and SCell #3 606 belongs to the dormancy group #2 610.

The UE may also receive a second RRC configuration indicating a dormant BWP for an SCell of the UE. As illustrated in FIG. 6, the UE may receive a second RRC configuration indicating a BWP#1A (which is a dormant BWP) for the SCell #1 602. The UE may receive another second RRC configuration indicating a BWP#1B (which is a dormant BWP) for the SCell #2 604. The UE may receive another second RRC configuration indicating a BWP#1C (which is a dormant BWP) for the SCell #3 606.

The UE may also receive a third RRC configuration indicating a non-dormant BWP for an SCell of the UE. As illustrated in FIG. 6, the UE may receive a third RRC configuration indicating a BWP#2A (which is a non-dormant BWP) for the SCell #1 602. The UE may receive another third RRC configuration indicating a BWP#2B (which is a non-dormant BWP) for the SCell #2 604. The UE may receive another third RRC configuration indicating a BWP#2C (which is a non-dormant BWP) for the SCell #3 606.

When an SCell (or the dormancy group to which the SCell belongs) is indicated as a cell on which the UE needs to perform/activate dormant operations, the dormant BWP configured for the SCell may be activated as the activated BWP, on which the dormant operations (e.g., actions 502 and 504 in FIG. 5) may be performed.

For example, when the SCell #1 602 is indicated as a cell on which the UE needs to perform the dormant operations, the BWP #1A may be activated as the activated BWP of the SCell #1 602. When the dormancy group #1 608 is indicated as a dormancy group on which the UE needs to perform the dormant operations, the BWP #1A may be activated as the activated BWP of the SCell#1 602 and the BWP#1B may be activated as the activated BWP of the SCell#2 604. On the BWP #1A and/or the first BWP #1B, the UE may perform the dormant operations (e.g., performing CSI measurements but no PDCCH monitoring). Similarly, when the SCell #3 606 (or the dormancy group #2 610 including the SCell #3 606) is indicated as an SCell (or a dormancy group) on which the UE needs to perform the dormant operations, the BWP #1C may be activated as the activated BWP of the SCell #3 606. The UE may perform the dormant operations on the BWP #1C.

When an SCell (or the dormancy group to which the SCell belongs) is indicated as a cell on which the UE does not need to perform the dormant operations, the non-dormant BWP configured for the SCell may be activated as the activated BWP, on which the dormant operations may not be performed. For example, when the SCell #1 602 is indicated as a cell on which the UE does not need to perform the dormant operations, the BWP #2A may be activated as the activated BWP of the SCell #1 602. When the dormancy group #1 608 is indicated as a dormancy group that the UE does not need to perform the dormant operations, the BWP #2A may be activated as the activated BWP of the SCell#1 602 and the BWP#2B may be activated as the activated BWP of the SCell#2 604.

On the BWP #2A, the UE may not perform the dormant operations. For example, the UE may perform PDCCH monitoring on the BWP #2A. Similarly, when the SCell #3 606 (or the dormancy group #2 610 including the SCell #3 606) is indicated as a cell (or a dormancy group) that UE does not need to perform the dormant operations, the BWP #2C may be activated as the activated BWP of the SCell #3 606.

In one implementation, the dormancy indication may include a bitmap associated with at least one dormancy group. Each bit of the bitmap may correspond to one of the at least one dormancy group. As illustrated in FIG. 6, the indication 620 may include a bitmap including several bits (e.g., bit $B_1$, bit $B_2$, etc.), where bit $B_1$ may correspond to the dormancy group #1 608, and the bit $B_2$ may correspond to the dormancy group #2 610.

In one implementation, a '0' value for a bit of the bitmap of the dormancy indication may indicate each activated SCell in the corresponding dormancy group entering dormant BWP (i.e., switch the activated BWP of each activated SCell belongs to the dormancy group to be a dormant BWP); a '1' value for a bit of the bitmap of the dormancy indication may indicate each activated SCell in the corresponding dormancy group leaving dormant BWP (i.e., (i.e., switch the activated BWP of each activated SCell belongs to the dormancy group to be a non-dormant BWP).

The following may be used to further elaborate the previously disclosed terms, examples, embodiments, actions, and/or behaviors:

UE: The UE may be referred to as a PHY/MAC/RLC/PDCP/SDAP entity. The PHY/MAC/RLC/PDCP/SDAP entity may refer to a UE.

Network: The network may be a network node, a TRP, a cell (e.g., SpCell, PCell, PSCell, and/or SCell), an eNB, a gNB, and/or a base station.

Serving Cell: A PCell, a PSCell, or an SCell. The serving cell may be an activated or a deactivated serving cell.

SpCell: For Dual Connectivity operation the term Special Cell refers to the PCell of the MCG or the PSCell of the SCG depending on if the MAC entity is associated with the MCG or the SCG, respectively. Otherwise, the term Special Cell refers to the PCell. A Special Cell supports PUCCH transmission and contention-based RA, and is always activated.

CC/Cell: The CC/Cell may be PCell, PSCell, and/or SCell.

UL-SCH resource: The UL-SCH resource may be RACH resource, PUCCH resource, and/or PUSCH resource. The UL-SCH resource may be scheduled by a dynamic grant (e.g., via PDCCH) and/or configured by RRC (e.g., type 1/type 2 configured UL grant or pre-configured in RRC configuration).

PSS: The PSS could be referred to as WUS, PDCCH-WUS, PDCCH-skipping, and/or go-to-sleep signaling. The PSS may be scrambled by a specific RNTI (e.g., PS-RNTI). The PSS may include one or more of the following information: Power saving technique associated with C-DRX (e.g., wake up and/or go to sleep), cross-slot scheduling, triggering RS transmission, CSI report, single/multi-cell operation, BWP information (e.g., BWP ID), SCell information (e.g., SCell ID) MIMO layer adaptation (e.g., the maximum number of MIMO layer), the number of antennas, an indication of CORESET/search space/candidate of subsequent PDCCH decoding, PDCCH monitoring periodicity, PDCCH skipping, skipping the number of DRX monitoring, SPS activation, DRX configuration, DRX cycle, etc. The monitoring occasion of PSS may be "indicated" to the UE by the NW with an offset before and or at the beginning (e.g., start symbol/slot/subframe) of DRX ON duration.

The term "indicated" may imply the explicit signaling by higher layer signaling or implicit through the CORESET/search space. For example, the NW may configure an offset to the UE. The NW may configure a specific CORESET and/or search space for PSS. The NW may configure a specific period for PSS, e.g., the period may be associated with the period of DRX cycle. The UE may monitor the PSS on the offset before and or at the beginning (e.g., start symbol/slot/subframe) of DRX ON duration on the specific CORESET and/or search space.

WUS: The WUS may have a field to indicate the UE needs to wake up or not wake up. In one implementation, the WUS may not have a field to indicate the UE needs to wake up or not wake-up. The UE receiving a WUS may imply the NW indicates to the UE to wake up (e.g., to monitor the PDCCH on the following on duration (i.e., to star the drx-onDurationTimer at the beginning of the subsequent DRX cycle)). The UE not receiving a WUS on a WUS occasion may imply the NW indicates to the UE to not wake up (e.g., not to monitor the PDCCH on the following on duration (i.e., not to star the drx-onDurationTimer at the beginning of the subsequent DRX cycle).

BFR: The term "BFR" may refer to a beam failure recovery procedure. The BFR procedure may be a PUCCH-based BFR procedure and/or a RACH-based BFR procedure.

RACH-based BFR procedure: The RACH-based BFR procedure may be performed based on the contention-free RA procedure and/or contention-based RA procedure. The RACH-based BFR procedure is initiated when the corresponding RA procedure is initiated. The RACH-based BFR procedure is ongoing when the corresponding RA procedure is ongoing. The RACH-based BFR procedure is stopped when the corresponding RA procedure is stopped. The RACH-based BFR procedure is completed when the corresponding RA procedure is completed.

PUCCH-based BFR procedure: The PUCCH-based BFR procedure may be performed based on BFR-SR. The PUCCH-based BFR procedure is initiated when the corresponding BFR-SR is triggered. The PUCCH-based BFR procedure is ongoing when the corresponding BFR-SR is pending. The PUCCH-based BFR procedure is stopped when the corresponding BFR-SR is canceled.

LBT: The term "LBT" may be referred to as an LBT failure detection and recovery procedure to handle consistent LBT failure in the NR-U system. Based on this mechanism, a recovery procedure may be initiated by the UE upon one or more (consistent) UL LBT failure(s) in order to prevent further delay of UL transmission(s).

Details of BWP switch delay may be provided in 3GPP TS 38.133 V15.5.0. The actual timing to perform the aforementioned behavior(s) may consider the BWP switch delay. For example, the UE may perform the aforementioned behavior(s) before or after the BWP switch delay, e.g., when the UE receives the BWP switch indication.

Active BWP Switch Delay

The requirements in this section apply for a UE configured with more than one BWP on PCell or any activated SCell in standalone NR or NE-DC, PCell, PSCell, or any activated SCell in MCG or SCG in NR-DC, or PSCell or any activated SCell in SCG in EN-DC. The UE may complete the switching of active DL and/or UL BWP within the delay defined in this section.

DCI and Timer-Based BWP Switch Delay

For DCI-based BWP switching, after the UE receives BWP switching request at DL slot n on a serving cell, the UE may be able to receive PDSCH (for DL active BWP switching) or transmit PUSCH (for UL active BWP switching) on the new BWP on the serving cell on which BWP switching on the first DL or UL slot occurs right after the beginning of DL slot $n+T_{BWPswitchDelay}$.

The UE is not required to transmit UL signals or receive DL signals during time duration $T_{BWPswitchDelay}$ on the cell where DCI-based BWP switching occurs. The UE is not required to follow the requirements defined in this section when performing a DCI-based BWP switching between the BWPs in disjoint channel bandwidths or in partially overlapping channel bandwidths.

For timer-based BWP switching, the UE may start BWP switching at DL slot n, where n is the beginning of a DL subframe (FR1) or DL half-subframe (FR2) immediately after a BWP-inactivity timer bwp-InactivityTimer expires on a serving cell, and the UE may be able to receive PDSCH (for DL active BWP switching) or transmit PUSCH (for UL active BWP switching) on the new BWP on the serving cell on which BWP switching on the first DL or UL slot occurs right after the beginning of DL slot $n+T_{BWPswitchDelay}$.

The UE is not required to transmit UL signals or receive DL signals after bwp-Inactivity Timer expires on the cell where timer-based BWP switching occurs.

Depending on UE capability bwp-SwitchingDelay, the UE may finish BWP switching within the time duration $T_{BWPswitchDelay}$ defined in Table 2.

TABLE 2

| | | BWP switch delay | |
|---|---|---|---|
| | NR Slot length | BWP switch delay $T_{BWPswitchDelay}$ (slots) | |
| μ | (ms) | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 18 |

Note 1:
Depends on UE capability.
Note 2:
If the BWP switching involves changing of SCS, the BWP switch delay is determined by the larger one between the SCS before BWP switching and the SCS after BWP switching.

RRC-Based BWP Switch Delay

For RRC-based BWP switching, after the UE receives BWP switching request, UE may be able to receive PDSCH/PDCCH (for DL active BWP switching) or transmit PUSCH (for UL active BWP switching) on the new BWP on the serving cell on which BWP switching occurs on the first DL or UL slot right after the beginning of DL slot $$n + \frac{T_{RRCprocessingDelay} + T_{BWPswitchDelayRRC}}{NR\ Slot\ length},$$

where

DL slot n is the last slot containing the RRC command, and $T_{RRCprocessingDelay}$ is the length of the RRC procedure delay in the time unit of a millisecond as defined in clause 12 in TS 38.331 (e.g., as specified in 3GPP TS 36.321 V15.4.0), and $T_{BWPswitchDelayRRC}=[6]$ms is the time used by the UE to perform BWP switching.

The UE is not required to transmit UL signals or receive DL signals during the time defined by $T_{RRCprocessingDelay}+T_{BWPswitchDelayRRC}$ on the cell where RRC-based BWP switching occurs.

Figure 7:
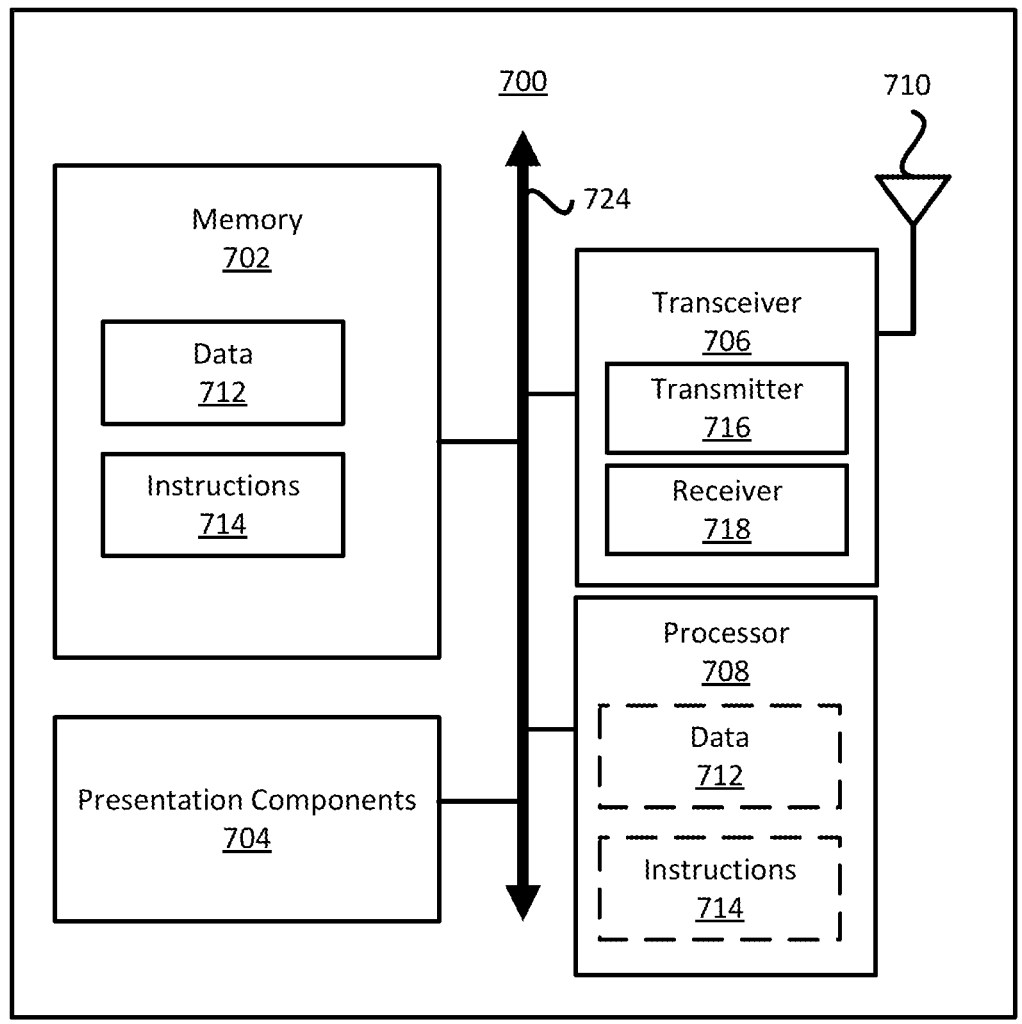
FIG. 7 illustrates a block diagram of a node for wireless communication, in accordance with various aspects of the present disclosure.

FIG. 7 illustrates a block diagram of a node 700 for wireless communication, in accordance with various aspects of the present disclosure. As illustrated in FIG. 7, the node 700 may include a transceiver 706, a processor 708, a memory 702, one or more presentation components 704, and at least one antenna 710. The node 700 may also include an RF spectrum band module, a BS communications module, a network communications module, and a system communications management module, Input/Output (I/O) ports, I/O components, and a power supply (not explicitly illustrated in FIG. 7). Each of these components may be in communication with each other, directly or indirectly, over one or more buses 724. In one implementation, the node 700 may be a UE or a BS that performs various functions described herein, for example, with reference to FIGS. 1 through 6.

The transceiver 706 having a transmitter 716 (e.g., transmitting/transmission circuitry) and a receiver 718 (e.g., receiving/reception circuitry) may be configured to transmit and/or receive time and/or frequency resource partitioning information. In one implementation, the transceiver 706 may be configured to transmit in different types of subframes and slots, including, but not limited to, usable, non-usable and flexibly usable subframes and slot formats. The transceiver 706 may be configured to receive data and control channels.

The node 700 may include a variety of computer-readable media. Computer-readable media can be any available media that can be accessed by the node 700 and include both volatile (and non-volatile) media and removable (and non-removable) media. By way of example, and not limitation, computer-readable media may include computer storage media and communication media. Computer storage media may include both volatile (and/or non-volatile) and removable (and/or non-removable) media implemented according to any method or technology for storage of information such as computer-readable instructions, data structures, program modules, or data.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal. Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared, and other wireless media. Combinations of any of the above should also be included within the scope of computer-readable media.

The memory 702 may include computer storage media in the form of volatile and/or non-volatile memory. The memory 702 may be removable, non-removable, or a combination thereof. For example, the memory 702 may include solid-state memory, hard drives, optical-disc drives, etc. As illustrated in FIG. 7, the memory 702 may store computer-readable and/or computer-executable instructions 714 (e.g., software codes) that are configured to, when executed, cause the processor 708 to perform various functions described herein, for example, with reference to FIGS. 1 through 6. Alternatively, the instructions 714 may not be directly executable by the processor 708 but may be configured to cause the node 700 (e.g., when compiled and executed) to perform various functions described herein.

The processor 708 (e.g., having processing circuitry) may include an intelligent hardware device, a Central Processing Unit (CPU), a microcontroller, an ASIC, etc. The processor 708 may include memory. The processor 708 may process the data 712 and the instructions 714 received from the memory 702, and information through the transceiver 706, the baseband communications module, and/or the network communications module. The processor 708 may also process information to be sent to the transceiver 706 for transmission through the antenna 710, to the network communications module for transmission to a CN.

One or more presentation components 704 may present data indications to a person or other devices. Examples of presentation components 704 may include a display device, speaker, printing component, vibrating component, etc.

From the present disclosure, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present disclosure is not limited to the specific implementations described above. Still, many rearrangements, modifications, and substitutions are possible without departing from the scope of the present disclosure.

What is claimed is:

1. A communication method for operations with Bandwidth Part (BWP) switching performed by a User Equipment (UE) configured, by a Base Station (BS), with a serving cell and a dormancy group, the serving cell belonging to the dormancy group, the communication method comprising:
    activating a dormant BWP as an activated BWP for the serving cell;
    receiving, from the BS, one of a first indication for BWP switching for the serving cell and a second indication for BWP switching for the dormancy group;
    switching the activated BWP for the serving cell, based on one of the first indication and the second indication, from the dormant BWP to a non-dormant BWP; and
    triggering a first Power Headroom Reporting (PHR) upon switching the activated BWP for the serving cell from the dormant BWP to the non-dormant BWP.

2. The communication method of claim 1, further comprising:
    activating the serving cell;
    activating a specific BWP for the serving cell upon activating the serving cell, the specific BWP configured by a BWP identity (firstActiveDownlinkBWP-Id); and
    triggering a second PHR after activating the serving cell if the specific BWP is not a dormant BWP.

3. The communication method of claim 2, further comprising:
    initializing or reinitializing any suspended configured grant of a specific configured grant on the specific BWP after activating the serving cell if the specific BWP is not a dormant BWP.

4. The communication method of claim 1, further comprising:
    initializing or reinitializing any suspended configured grant of a specific configured grant on the non-dormant BWP upon switching the activated BWP for the serving cell from the dormant BWP to the non-dormant BWP.

5. The communication method of claim 1, further comprising performing operations on the dormant BWP, the operations comprising:
    stopping monitoring a Physical Downlink Control Channel (PDCCH) on the serving cell; and
    performing Channel State Information (CSI) measurements for the serving cell.

6. The communication method of claim 1, wherein:
    the second indication includes a bit;
    when the bit is set to a first binary value, the UE is indicated to switch the activated BWP for the serving cell from the non-dormant BWP to the dormant BWP; and
    when the bit is set to a second binary value, the UE is indicated to switch the activated BWP for the serving cell from the dormant BWP to the non-dormant BWP.

7. The communication method of claim 1, wherein the second indication is received via a Physical Downlink Control Channel (PDCCH), and the indication is included in one of Downlink Control Information (DCI) scrambled by a Power Saving Radio Network Temporary Identity (PS-RNTI), DCI with format 0_1, and DCI with format 1_1.

8. The communication method of claim 1, wherein the second indication includes a bitmap associated with at least one dormancy group, each bit of the bitmap corresponding to one of the at least one dormancy group.

9. The communication method of claim 1, wherein the first indication is received, via a Physical Downlink Control Channel (PDCCH) or via a Radio Resource Control (RRC) reconfiguration message, for BWP switching for the serving cell.

10. The communication method of claim 1, wherein the dormant BWP and the non-dormant BWP are Downlink (DL) BWPs.

11. A User Equipment (UE) for operations with Bandwidth Part (BWP) switching, the UE configured, by a Base Station (BS), with a serving cell and a dormancy group, the serving cell belonging to the dormancy group, the UE comprising:
    a processor; and
    a memory coupled to the processor, wherein the memory stores at least one computer-executable program that, when executed by the processor, causes the processor to:
        activate a dormant BWP as an activated BWP for the serving cell;

receive, from the BS, one of a first indication for BWP switching for the serving cell and a second indication for BWP switching for the dormancy group;

switch the activated BWP for the serving cell, based on one of the first indication and the second indication, from the dormant BWP to a non-dormant BWP; and trigger a first Power Headroom Reporting (PHR) upon switching the activated BWP for the serving cell from the dormant BWP to the non-dormant BWP.

12. The UE of claim 11, wherein when the at least one computer-executable program is executed by the processor, the computer-executable program further causes the processor to:

activate the serving cell;

activate a specific BWP for the serving cell upon activating the serving cell, the specific BWP configured by a BWP identity (firstActiveDownlinkBWP-Id); and trigger a second PHR after activating the serving cell if the specific BWP is not a dormant BWP.

13. The UE of claim 12, wherein when the at least one computer-executable program is executed by the processor, the computer-executable program further causes the processor to:

initialize or reinitialize any suspended configured grant of a specific configured grant on the specific BWP after activating the serving cell if the specific BWP is not a dormant BWP.

14. The UE of claim 11, wherein when the at least one computer-executable program is executed by the processor, the computer-executable program further causes the processor to:

initialize or reinitialize any suspended configured grant of a specific configured grant on the non-dormant BWP upon switching the activated BWP for the serving cell from the dormant BWP to the non-dormant BWP.

15. The UE of claim 11, wherein when the at least one computer-executable program is executed by the processor, the computer-executable program further causes the processor to perform operations on the dormant BWP, the operations comprising:

stopping monitoring a Physical Downlink Control Channel (PDCCH) on the serving cell; and performing Channel State Information (CSI) measurements for the serving cell.

16. The UE of claim 11, wherein:

the second indication includes a bit;

when the bit is set to a first binary value, the UE is indicated to switch the activated BWP for the serving cell from the non-dormant BWP to the dormant BWP; and when the bit is set to a second binary value, the UE is indicated to switch the activated BWP for the serving cell from the dormant BWP to the non-dormant BWP.

17. The UE of claim 11, wherein the second indication is received via a Physical Downlink Control Channel (PDCCH), and the indication is included in one of Downlink Control Information (DCI) scrambled by a Power Saving Radio Network Temporary Identity (PS-RNTI), DCI with format 0_1, and DCI with format 1_1.

18. The UE of claim 11, wherein the second indication includes a bitmap associated with at least one dormancy group, each bit of the bitmap corresponding to one of the at least one dormancy group.

19. The UE of claim 11, wherein the first indication is received, via a Physical Downlink Control Channel (PDCCH) or via a Radio Resource Control (RRC) reconfiguration message, for BWP switching for the serving cell.

20. The UE of claim 11, wherein the dormant BWP and the non-dormant BWP are Downlink (DL) BWPs.

* * * * *